US011982232B2

(12) United States Patent
Wiedenhoefer et al.

(10) Patent No.: US 11,982,232 B2
(45) Date of Patent: *May 14, 2024

(54) AIRCRAFT HEAT EXCHANGERS

(71) Applicant: RTX Corporation, Farmington, CT (US)

(72) Inventors: James F. Wiedenhoefer, Windsor, CT (US); Russell J. Bergman, South Windsor, CT (US); William P. Stillman, Westminster, CO (US); Patrick M. Hart, Newington, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,130

(22) Filed: Jan. 23, 2023

(65) Prior Publication Data

US 2023/0160342 A1    May 25, 2023

Related U.S. Application Data

(63) Continuation of application No. 17/124,551, filed on Dec. 17, 2020, now Pat. No. 11,585,273.

(Continued)

(51) Int. Cl.
*F02C 7/18* (2006.01)
*B64D 33/10* (2006.01)
(Continued)

(52) U.S. Cl.
CPC ............. *F02C 7/185* (2013.01); *B64D 33/10* (2013.01); *F02K 3/025* (2013.01); *F02K 3/105* (2013.01);
(Continued)

(58) Field of Classification Search
CPC .......... F28D 7/0075; F28D 2021/0021; F28D 2021/0026; F28F 2215/06; F02K 3/077; F02K 3/115
See application file for complete search history.

(56) References Cited

U.S. PATENT DOCUMENTS

| 2,650,073 A | 8/1953 | Holm |
| 3,507,115 A | 4/1970 | Wisoka |

(Continued)

FOREIGN PATENT DOCUMENTS

| CN | 108869044 A | 11/2018 |
| CN | 110553533 A | 12/2019 |

(Continued)

OTHER PUBLICATIONS

Chris Wiegand et al., "F-35 Air Vehicle Technology Overview", Aviation Technology, Integration, and Operations Conference, Jun. 2018, American Institute of Aeronautics and Astronautics, Inc., Reston, Virginia.

(Continued)

*Primary Examiner* — Kyle Robert Thomas
(74) *Attorney, Agent, or Firm* — Bachman & LaPointe, P.C.

(57) ABSTRACT

A turbine engine heat exchanger has: a manifold having a first face and a second face opposite the first face; a plurality of first plates along the first face, each first plate having an interior passageway; and a plurality of second plates along the second face, each second plate having an interior passageway. A first flowpath passing through the interior passageways of the first plates, the manifold, and the interior passageways of the second plates.

20 Claims, 3 Drawing Sheets

Related U.S. Application Data

(60) Provisional application No. 62/963,297, filed on Jan. 20, 2020.

(51) Int. Cl.
*F02K 3/02* (2006.01)
*F02K 3/105* (2006.01)
*F28D 7/00* (2006.01)

(52) U.S. Cl.
CPC ...... *F28D 7/0075* (2013.01); *F05D 2220/323* (2013.01); *F05D 2260/213* (2013.01)

(56) References Cited

U.S. PATENT DOCUMENTS

| | | | |
|---|---|---|---|
| 3,552,488 A | 1/1971 | Grill et al. | |
| 4,137,705 A | 2/1979 | Anderson et al. | |
| 4,438,809 A | 3/1984 | Papis | |
| 4,520,868 A | 6/1985 | Grawey | |
| 4,715,431 A | 12/1987 | Schwarz et al. | |
| 4,813,112 A | 3/1989 | Pilliez | |
| 5,009,263 A | 4/1991 | Seshimo et al. | |
| 5,107,922 A | 4/1992 | So | |
| 5,318,114 A | 6/1994 | Sasaki | |
| 5,417,280 A | 5/1995 | Hayashi et al. | |
| 5,443,116 A | 8/1995 | Hayashi et al. | |
| 5,517,757 A | 5/1996 | Hayashi et al. | |
| 5,531,268 A | 7/1996 | Hoshino et al. | |
| 5,718,127 A | 2/1998 | Aitken | |
| 6,134,880 A | 10/2000 | Yoshinaka | |
| 6,328,100 B1 | 12/2001 | Haussmann | |
| 6,430,931 B1 | 8/2002 | Horner | |
| 6,564,863 B1 | 5/2003 | Martins | |
| 6,607,026 B1 | 8/2003 | Naji et al. | |
| 6,945,320 B2 | 9/2005 | Harvard, Jr. et al. | |
| 7,334,411 B2 | 2/2008 | Vandermolen | |
| 7,669,645 B2 | 3/2010 | Nakamura | |
| 7,770,633 B2 | 8/2010 | Miyahara | |
| 7,784,528 B2 | 8/2010 | Ottow et al. | |
| 7,861,512 B2 | 1/2011 | Olver et al. | |
| 7,950,149 B2 | 5/2011 | Golecki | |
| 8,181,443 B2 | 5/2012 | Rago | |
| 8,266,888 B2 | 9/2012 | Liu | |
| 8,387,362 B2 | 3/2013 | Storage et al. | |
| 8,438,835 B2 | 5/2013 | Perveiler et al. | |
| 8,573,291 B2 | 11/2013 | Vick | |
| 8,656,988 B1 | 2/2014 | Paul et al. | |
| 8,689,547 B2 | 4/2014 | Burgers et al. | |
| 8,770,269 B2 | 7/2014 | Scott | |
| 8,784,047 B2 | 7/2014 | Elder | |
| 9,200,855 B2 | 12/2015 | Kington et al. | |
| 9,243,563 B2 | 1/2016 | Lo | |
| 9,328,968 B2 | 5/2016 | Vanderwees | |
| 9,341,119 B2* | 5/2016 | Rhoden ................ F02K 3/077 | |
| 9,377,250 B2 | 6/2016 | Landre | |
| 9,732,702 B2 | 8/2017 | Ueda | |
| 9,752,803 B2 | 9/2017 | Matter, III et al. | |
| 9,766,019 B2 | 9/2017 | Eleftheriou et al. | |
| 9,771,867 B2 | 9/2017 | Karam et al. | |
| 9,816,766 B2 | 11/2017 | Miller et al. | |
| 9,835,043 B2 | 12/2017 | Kantany et al. | |
| 9,851,159 B2 | 12/2017 | Cameron | |
| 9,909,812 B2 | 3/2018 | Peskos et al. | |
| 9,982,630 B2 | 5/2018 | Marini et al. | |
| 10,041,741 B2 | 8/2018 | Turcotte et al. | |
| 10,100,740 B2 | 10/2018 | Thomas | |
| 10,125,684 B2 | 11/2018 | Yu | |
| 10,175,003 B2 | 1/2019 | Sennoun et al. | |
| 10,184,400 B2 | 1/2019 | Cerny et al. | |
| 10,208,621 B2 | 2/2019 | Hoefler et al. | |
| 10,222,142 B2 | 3/2019 | Alvarez et al. | |
| 10,316,750 B2 | 6/2019 | Loebig et al. | |
| 10,422,585 B2 | 9/2019 | Jensen et al. | |
| 10,480,407 B2 | 11/2019 | Alecu | |
| 10,830,540 B2 | 11/2020 | Sennoun et al. | |
| 10,926,364 B2 | 2/2021 | Thresher | |
| 11,219,841 B2 | 1/2022 | Wan et al. | |
| 11,585,273 B2* | 2/2023 | Wiedenhoefer ......... F02K 3/105 | |
| 2001/0018024 A1 | 8/2001 | Hyde et al. | |
| 2004/0026072 A1 | 2/2004 | Yi et al. | |
| 2004/0040153 A1 | 3/2004 | Ashida et al. | |
| 2004/0050531 A1 | 3/2004 | Horiuchi et al. | |
| 2004/0111829 A1 | 6/2004 | Bruno et al. | |
| 2006/0131009 A1* | 6/2006 | Nies ................ F28D 1/05391 165/177 |
| 2008/0283234 A1 | 11/2008 | Sagi et al. | |
| 2009/0169359 A1* | 7/2009 | Murphy ................ F02K 1/46 415/176 |
| 2010/0084120 A1 | 4/2010 | Yin et al. | |
| 2010/0170262 A1 | 7/2010 | Kaslusky et al. | |
| 2011/0088405 A1 | 4/2011 | Turco | |
| 2011/0146944 A1 | 6/2011 | Hand et al. | |
| 2011/0168366 A1 | 7/2011 | Garret et al. | |
| 2013/0199152 A1 | 8/2013 | Menheere et al. | |
| 2013/0213623 A1 | 8/2013 | Perocchio et al. | |
| 2014/0246179 A1 | 9/2014 | Vallee et al. | |
| 2014/0318751 A1 | 10/2014 | Kinder et al. | |
| 2015/0047818 A1 | 2/2015 | Peskos et al. | |
| 2015/0047820 A1 | 2/2015 | Rhoden | |
| 2016/0069266 A1 | 3/2016 | Murphy et al. | |
| 2016/0123230 A1* | 5/2016 | Thomas ................ F02K 3/115 60/39.83 |
| 2016/0177828 A1* | 6/2016 | Snyder ................ F02K 3/077 415/144 |
| 2016/0230669 A1 | 8/2016 | Selstad et al. | |
| 2016/0265850 A1 | 9/2016 | Kupiszewski et al. | |
| 2016/0362999 A1 | 12/2016 | Ho | |
| 2017/0009703 A1 | 1/2017 | Moon et al. | |
| 2017/0184024 A1 | 6/2017 | Sennoun | |
| 2017/0363361 A1 | 12/2017 | Turney | |
| 2018/0051935 A1 | 2/2018 | Roberge | |
| 2018/0058472 A1 | 3/2018 | Tajiri et al. | |
| 2018/0172368 A1 | 6/2018 | Kowalski et al. | |
| 2018/0238238 A1 | 8/2018 | Luschek et al. | |
| 2018/0238630 A1 | 8/2018 | Pollard et al. | |
| 2018/0244127 A1 | 8/2018 | Sennoun et al. | |
| 2018/0245853 A1 | 8/2018 | Sennoun et al. | |
| 2018/0258859 A1 | 9/2018 | Suciu et al. | |
| 2018/0292140 A1 | 10/2018 | Mayo et al. | |
| 2018/0328285 A1 | 11/2018 | Tajiri et al. | |
| 2019/0154345 A1 | 5/2019 | Martinez et al. | |
| 2019/0170445 A1 | 6/2019 | McCaffrey | |
| 2019/0170455 A1 | 6/2019 | McCaffrey | |
| 2019/0204012 A1 | 7/2019 | Army et al. | |
| 2019/0212074 A1 | 7/2019 | Lockwood et al. | |
| 2019/0234690 A1 | 8/2019 | Sobolak et al. | |
| 2019/0277571 A1 | 9/2019 | Disori et al. | |
| 2019/0277579 A1 | 9/2019 | Disori et al. | |
| 2019/0293365 A1 | 9/2019 | Disori et al. | |
| 2019/0293366 A1 | 9/2019 | Disori et al. | |
| 2019/0310030 A1 | 10/2019 | Disori et al. | |
| 2019/0339012 A1 | 11/2019 | Disori et al. | |
| 2020/0072559 A1 | 3/2020 | Sennoun et al. | |
| 2020/0189046 A1 | 6/2020 | Ravindranath et al. | |
| 2020/0347737 A1 | 11/2020 | Bordoni | |
| 2020/0395890 A1 | 12/2020 | Hutting et al. | |
| 2021/0207535 A1 | 7/2021 | Bergman et al. | |
| 2021/0222962 A1 | 7/2021 | Wiedenhoefer et al. | |
| 2021/0222963 A1 | 7/2021 | Bergman et al. | |
| 2021/0285375 A1 | 9/2021 | Wiedenhoefer et al. | |
| 2021/0318071 A1 | 10/2021 | Hart et al. | |
| 2022/0373263 A1 | 11/2022 | Wiedenhoefer et al. | |

FOREIGN PATENT DOCUMENTS

| | | |
|---|---|---|
| DE | 9309822 U1 | 11/1994 |
| DE | 19515528 A1 | 10/1996 |
| DE | 102008051422 A1 | 4/2010 |
| EP | 656517 A1 | 11/1994 |
| FR | 2770632 A1 | 5/1999 |
| FR | 3075870 A1 | 6/2019 |
| GB | 574450 A | 1/1946 |
| IN | 101309577 A | 11/2008 |

(56) References Cited

FOREIGN PATENT DOCUMENTS

| JP | H0961084 A | 3/1997 |
|---|---|---|
| JP | 11-148793 A | 6/1999 |
| WO | 2021/138307 A1 | 7/2021 |
| WO | 2021/146674 A1 | 7/2021 |

OTHER PUBLICATIONS

Jonathan Lowell, "Keeping Cool over Salt Lake", Aug. 25, 2019, US Air Force, Washington, DC, retrieved from Internet Nov. 9, 2019 https://www.af.mil/News/Commentaries/Display/Article/1941943/keeping-cool-over-salt-lake/.

Sean Robert Nuzum, Thesis: "Aircraft Thermal Management using Liquefied Natural Gas", Apr. 27, 2016, Wright State University, Dayton, Ohio.

U.S. Office Action dated Nov. 9, 2021 for U.S. Appl. No. 17/139,174.

U.S. Office Action dated Apr. 26, 2022 for U.S. Appl. No. 17/137,946.

Extended European Search Report dated Mar. 31, 2022 for European Patent Application No. 20910078.3 (EP stage of PCT/US20/67289-WO/2021/138307).

Extended European Search Report dated Mar. 31, 2022 for European Patent Application No. 21191780.2 (EP divisional of PCT/US20/67289-WO/2021/138307).

European Search Report dated Nov. 19, 2021 for European Patent Application No. 21191780.2 (EP stage of PCT/US2020/067289-WO/2021/138307).

European Search Report dated Nov. 25, 2021 for European Patent Application No. 20910078.3 (EP stage of PCT/US2020/067289-WO/2021/138307).

Mitch Wolff, "Aerothermal Design of an Engine/Vehicle Thermal Management System", 2011, RTO-EN-AVT-195. Nato, Brussels, Belgium.

International Search Report and Written Opinion dated Mar. 19, 2021 for PCT/US20/67289.

International Search Report and Written Opinion dated Mar. 31, 2021 for PCT/US21/13804.

European Search Report dated Feb. 7, 2022 for European Patent Application No. 21740964.8 (EP stage of PCT/US2021/013804-WO/2021/146674).

European Search Report dated Oct. 20, 2021 for European Patent Application No. 20218011.3.

U.S. Office Action dated Dec. 13, 2021 for U.S. Appl. No. 17/124,551.

U.S. Office Action dated Jul. 26, 2022 for U.S. Appl. No. 17/124,551.

U.S. Office Action dated Jul. 6, 2023 for U.S. Appl. No. 17/125,214 (published as 2021/0207535A1).

\* cited by examiner

AIRCRAFT HEAT EXCHANGERS

CROSS-REFERENCE TO RELATED APPLICATION

This is a continuation of U.S. patent application Ser. No. 17/124,551, filed Dec. 17, 2020, and entitled "Aircraft Heat Exchangers", now U.S. Pat. No. 11585273B1, which claims benefit of U.S. Patent Application No. 62/963,297, filed Jan. 20, 2020, and entitled "Aircraft Heat Exchangers", the disclosure of which is incorporated by reference herein in its entirety as if set forth at length.

BACKGROUND

The disclosure relates to gas turbine engine heat exchangers. More particularly, the disclosure relates to air-to-air heat exchangers.

Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer of thermal energy from a flow (heat donor flow) diverted from an engine core flow to a bypass flow (heat recipient flow). For example, air is often diverted from the compressor for purposes such as cooling. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use). Among further uses for heat exchangers in aircraft are power and thermal management systems (PTMS) also known as integrated power packages (IPP). One example is disclosed in United States Patent Application publication 20100170262A1, Kaslusky et al., Jul. 8, 2010, "AIRCRAFT POWER AND THERMAL MANAGEMENT SYSTEM WITH ELECTRIC CO-GENERATION". Another example is disclosed in United States Patent Application publication 20160362999A1, Ho, Dec. 15, 2016, "EFFICIENT POWER AND THERMAL MANAGEMENT SYSTEM FOR HIGH PERFORMANCE AIRCRAFT". Another example is disclosed in United States Patent Application publication 20160177828A1, Snyder et al., Jun. 23, 2016, "STAGED HEAT EXCHANGERS FOR MULTI-BYPASS STREAM GAS TURBINE ENGINES".

U.S. Pat. No. 10,100,740 (the '740 patent, the disclosure of which is incorporated by reference in its entirety herein as if set forth at length), to Thomas, Oct. 16, 2018, "Curved plate/fin heater exchanger", shows attachment of a square wave form fin array to the side of a heat exchanger plate body. For plates in a radial array, the wave amplitude progressively increases to accommodate a similar increase in inter-plate spacing.

SUMMARY

One aspect of the disclosure involves a turbine engine heat exchanger comprising: a manifold having a first face and a second face opposite the first face; a plurality of first plates along the first face, each first plate having an interior passageway; and a plurality of second plates along the second face, each second plate having an interior passageway. A first flowpath passes through the interior passageways of the first plates, the manifold, and the interior passageways of the second plates.

In a further embodiment of any of the foregoing embodiments, additionally and/or alternatively, the first flowpath passes sequentially through: the interior passageways of the first plates; the manifold; and the interior passageways of the second plates.

In a further embodiment of any of the foregoing embodiments, additionally and/or alternatively, the manifold forms a plenum into which respective first flowpath legs through the first plates merge and from which respective second flowpath legs through the second plates split.

In a further embodiment of any of the foregoing embodiments, additionally and/or alternatively, the first face is concave and the second face is convex.

In a further embodiment of any of the foregoing embodiments, additionally and/or alternatively, the first plates and the second plates comprise castings.

In a further embodiment of any of the foregoing embodiments, additionally and/or alternatively, the first plates and the second plates each have: a proximal edge mounted to the manifold and an opposite distal edge; a forward edge and an aft edge; and an inlet to the respective first passageway and an outlet from the respective first passageway. The first plates' outlets are along the associated first plate proximal edge, forward of the first plates' inlets. The second plates' inlets are along the associated second plate proximal edge. The second plates' outlets are forward of the second plates' inlets.

In a further embodiment of any of the foregoing embodiments, additionally and/or alternatively: the first plates are circumferentially arrayed in at least one first bank; and the second plates are in at least one second bank, wherein within each second bank the second plates share a common parallel orientation.

In a further embodiment of any of the foregoing embodiments, additionally and/or alternatively, within one to all said banks all plates are joined to each other by wave fins.

A further aspect of the disclosure involves, a turbine engine including the turbine engine heat exchanger of any of the foregoing embodiments and further comprising: one or more fan sections; one or more compressor sections aft and downstream of the one or more fan sections along a core flowpath; a combustor section downstream of the one or more compressor sections along the core flowpath; one or more turbine sections downstream of the combustor section along the core flowpath; an outer bypass flowpath; an inner bypass flowpath; and a wall between the outer bypass flowpath and the inner bypass flowpath. Exteriors of the first plates are along the inner bypass flowpath; and exteriors of the second plates are along the outer bypass flowpath.

In a further embodiment of any of the foregoing embodiments, additionally and/or alternatively, the first flowpath is a compressor bleed flowpath.

In a further embodiment of any of the foregoing embodiments, additionally and/or alternatively, the first flowpath provides turbine cooling.

In a further embodiment of any of the foregoing embodiments, additionally and/or alternatively, the inner bypass flowpath extends from a stage of the one or more fan sections; and the outer bypass flowpath extends from another stage of the one or more fan sections upstream of said stage.

In a further embodiment of any of the foregoing embodiments, additionally and/or alternatively, the first flowpath extends from within or downstream of the one or more compressor sections.

In a further embodiment of any of the foregoing embodiments, additionally and/or alternatively, the first plates and the second plates each have: an inner diameter edge and an outer diameter edge; and an inlet to the respective first passageway and an outlet from the respective first passageway. The first plates' outlets are along the associated first plate outer diameter edge, forward of the first plates' inlets. The second plates' inlets are along the associated second plate inner diameter edge. The second plates' outlets are forward of the second plates' inlets.

In a further embodiment of any of the foregoing embodiments, additionally and/or alternatively, the first plates' inlets are along the associated first plate outer diameter edge.

In a further embodiment of any of the foregoing embodiments, additionally and/or alternatively, the second plates' outlets are along the associated second plate inner diameter edge.

Another aspect of the disclosure involves a method for using the turbine engine of any of the foregoing embodiments. The method comprises running the turbine engine to: transfer thermal energy from a flow along the first flowpath to an inner bypass flow along the inner bypass flowpath and an outer bypass flow along the outer bypass flowpath.

In a further embodiment of any of the foregoing embodiments, additionally and/or alternatively, the running: passes the outer bypass flow to the heat exchanger at a first temperature and first pressure; passes the inner bypass flow to the heat exchanger at a second temperature and second pressure greater than the first temperature and first pressure, respectively; and passes the flow along the first flowpath to the heat exchanger at a third temperature and third pressure greater than the second temperature and second pressure, respectively.

In a further embodiment of any of the foregoing embodiments, additionally and/or alternatively, flow is generally counterflow to the inner bypass flow and outer bypass flow.

Another aspect of the disclosure involves a turbine engine comprising: one or more fan sections; one or more compressor sections downstream of the one or more fan sections along a core flowpath; a combustor section downstream of the one or more compressor sections along the core flowpath; one or more turbine sections downstream of the combustor section along the core flowpath; an outer bypass flowpath; an inner bypass flowpath; and a wall between the outer bypass flowpath and the inner bypass flowpath. The engine further comprises a heat exchanger comprising: a first plate array in the inner bypass flowpath; a second plate array in the outer bypass flowpath; and a manifold between the first plate array and second plate array.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
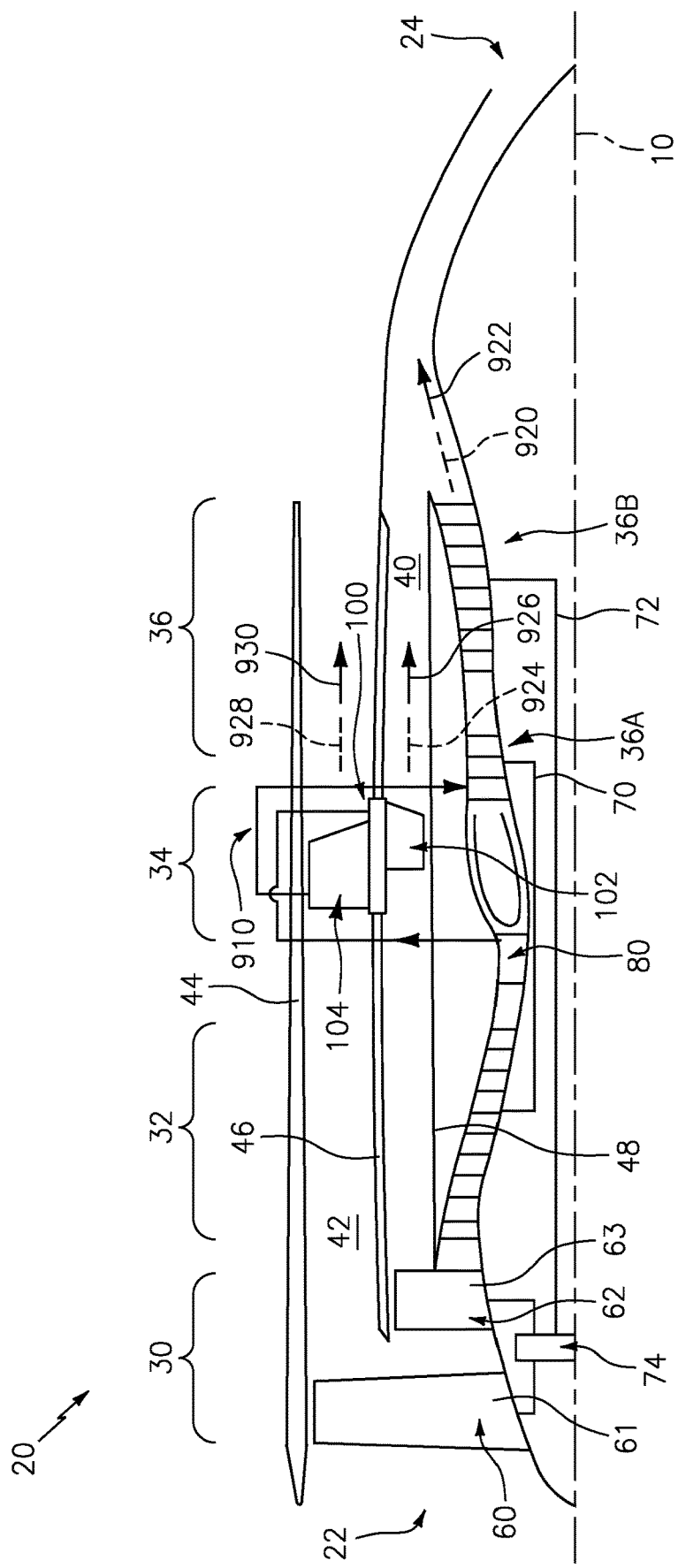
FIG. 1 is a schematic central longitudinal half sectional view of a turbofan engine.

FIG. 1 shows a gas turbine engine 20 as an exemplary turbofan engine. The engine 20 has an upstream or inlet end 22 and a downstream or outlet end 24 and a central longitudinal axis or centerline 10. A core flowpath 920 passing a core flow 922 passes sequentially from the inlet to the outlet through one or more fan sections 30, one or more compressor sections 32, a combustor section 34, and one or more turbine sections 36. The exemplary engine has at least two bypass flowpaths: an inner bypass flowpath 924 passing an inner bypass flow 926 through an inner duct 40; and an outer bypass flowpath 928 passing an outer bypass flow 930 through an outer duct 42. An outer diameter boundary of the outer duct is formed by a nacelle or case structure (depending upon implementation) 44. The inner duct 40 and outer duct 42 and their associated flowpaths are separated by a wall or case structure 46. An inner diameter boundary of the inner duct 40 is formed by a case structure 48.

For purposes of illustration, the exemplary one or more fan sections 30 is a single fan section having two stages 60, 62 of blades 61, 63 (additional vane stage(s) or other structures not shown and other blade stage counts are possible). The exemplary compressor section 32 is a single compressor section with multiple stages of rotating blades interspersed with non-rotating vanes. The exemplary combustor section 34 is an annular combustor. An alternative combustor is a circumferential array of can-type combustors. The exemplary one or more turbine sections 36 is two turbine sections 36A, 36B each comprising one or more rotating blade stages and one or more non-rotating vane stages. The exemplary first turbine section 36A is upstream of the second section 36B along the core flowpath 920 to operate at a higher pressure. In the exemplary engine, the first turbine section 36A directly drives the compressor section 36 via a shaft 70. The second turbine section 36B drives the fan section 30 via a shaft 72. The exemplary fan is driven via a reduction gear system 74 (e.g., epicyclic).

In the exemplary engine, the outer bypass flowpath 928 extends from the first fan stage 60; whereas, the inner bypass flowpath 924 extends from the second fan stage 62. Other configurations may have these extend from different stages. There may be more fan stages with either more stages upstream of the outer bypass flowpath or downstream. In other configurations, the inner bypass flowpath may extend from one of the compressor section stages.

In the exemplary implementation, a heat exchanger 100 is integrated with the case structure 46. More particularly, the heat exchanger 100 has a plurality of inner (inner diameter (ID)) plates (panels) 102 extending across the inner bypass flowpath 924 and a plurality of outer (outer diameter (OD)) plates 104 extending across the outer bypass flowpath 928. In general, the term "plate" or "panel" may be applied at any of several levels of detail. It may identify a body or substrate of an assembly or the greater assembly or subassembly (e.g., a cast substrate plus one or more separately-attached fin arrays). The bypass flows 926 and 930 may be used to cool a further flow 910 (FIG. 2) passing through interiors of the plates 102, 104. For example, the further flow may be a bleed flow bled from within or downstream of the one or more compressor sections 32 (e.g., from a diffuser 80 (FIG. 1) between the compressor and combustor).

Figure 2:
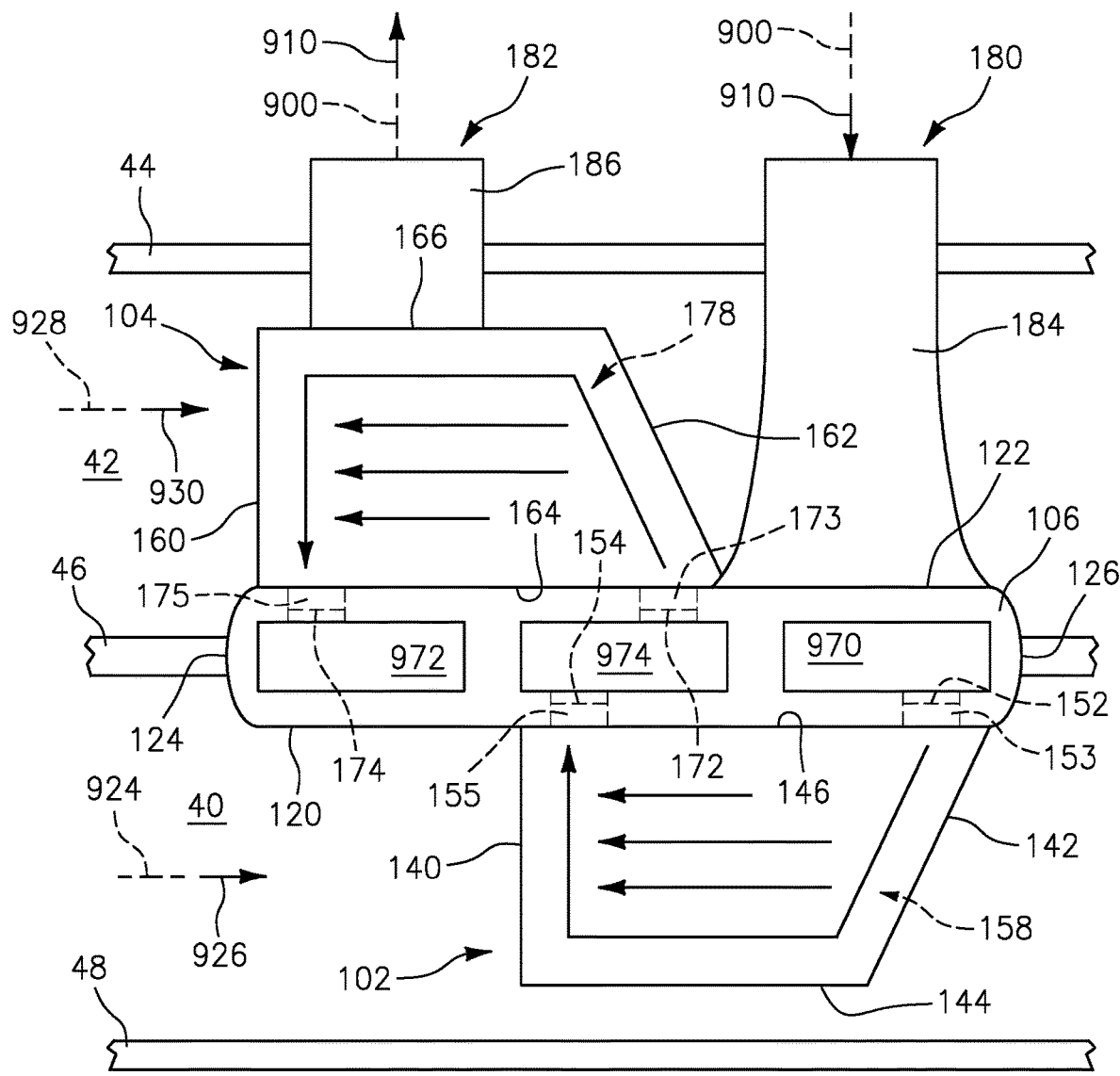
FIG. 2 is an enlarged axial cutaway view of a heat exchanger in the engine of FIG. 1.

FIG. 2 further schematically shows details of the heat exchanger 100. In addition to the plates 102 and 104, the heat exchanger includes a manifold 106 situated within the wall of the case structure 46. The exemplary manifold 106 may be a full annulus or a segment thereof or may be a flat segment or some combination. The manifold 106 has an inner diameter (ID) surface 120, an outer diameter surface 122, a leading end 124, and a trailing end 126. If segmented, the manifold may have a first circumferential end 128 (FIG. 3) and a second circumferential end 130. The manifold of the heat exchanger may be mounted in an aperture of a main section of the wall of the case structure 46 (e.g., via bolts, brazing, welding, and the like—not shown) to become a portion of the wall separating the two bypass flowpaths and ducts.

Each inner plate 102 (or body section/substrate thereof) has a leading end 140 (FIG. 2), a trailing end 142, an inner diameter (ID) edge 144, and an outer diameter (OD) edge 146. Each inner plate 102 has a first face 148 (FIG. 3) and a second face 150 opposite the first face. Similarly, the outer plates (or body section/substrate thereof) each have a leading end 160 (FIG. 2), a trailing end 162, an inner diameter (ID) edge 164 and an outer diameter (OD) edge 166, and first and second faces 168 and 170 (FIG. 3), and. In the illustrated embodiment, the inner plate OD edges are mounted to the manifold ID surface 120 and are thus proximal edges (the ID edges being distal edges). Similarly, the outer plate ID edges are mounted to the manifold OD surface 122 and are thus proximal edges (the OD edges being distal edges).

Each inner plate 102 has an inlet 152 along the OD edge 146 and an outlet 154 along the OD edge 146. The inlet and outlet may be on respective plugs 153, 155 protruding from a main portion of the OD edge and received in associated sockets in the manifold ID wall. Each outer plate 104 has an inlet 172 along its ID edge 168 and an outlet 174 also along its ID edge. The inlet and outlet may be on respective plugs 173, 175 protruding from a main portion of the ID edge and received in associated sockets in the manifold OD wall. Each plate has an interior 158,178 (FIG. 2) defining one or more passageways and associated legs/branches of the flowpath 900 between the inlet and outlet. Exemplary plates may be secured to the manifold unit such as by brazing, welding, and/or fasteners.

In, the exemplary embodiment of FIG. 2, the manifold 106 includes an inlet plenum 970, an outlet plenum 972, and a transfer plenum 974. The heat exchanger 100 has one or more inlets 180 to the inlet plenum 970 and one or more outlets 182 from the outlet plenum 972. Exemplary inlets and outlets extend from the OD surface 122. The exemplary inlet(s) 180 and outlet(s) 182 are on respective conduits 184, 186 extending radially outward circumferentially centrally from the manifold so as to separate two banks of the outer plates 104 from each other. In distinction, there is a single continuous inner bank. Yet other configurations are possible including circumferential outlets at one or both ends 128, 130, axial inlets or outlets at one or both ends 124, 126, ports on or extending from the manifold ID surface 120, and the like. For example, a manifold configuration with a single first flow inlet and branched first flow outlets is shown in copending U.S. Patent Application No. 62/957,091 (the '091 application), filed Jan. 3, 2020, and entitled "Aircraft Heat Exchanger Assembly", the disclosure of which is incorporated by reference herein in its entirety as if set forth at length.

The exemplary inlet plenum 970 distributes/divides the inlet flow from the inlet(s) 180 to all the associated inner plates 102. The exemplary transfer plenum 974 receives and combines flow from all the associated inner plates 102 and distributes/divides the flow to all the associated outer plates 104. Alternatively, instead of a transfer plenum 974, there may be individual passageways coupling individual inner plate outlets 154 to individual outer plate inlets 172. The outlet plenum 972 collects the outflow from the outer plate outlets 174 and may pass such flow in one combined flow to the outlet 182 or multiple branches for subsequent use.

Figure 3:
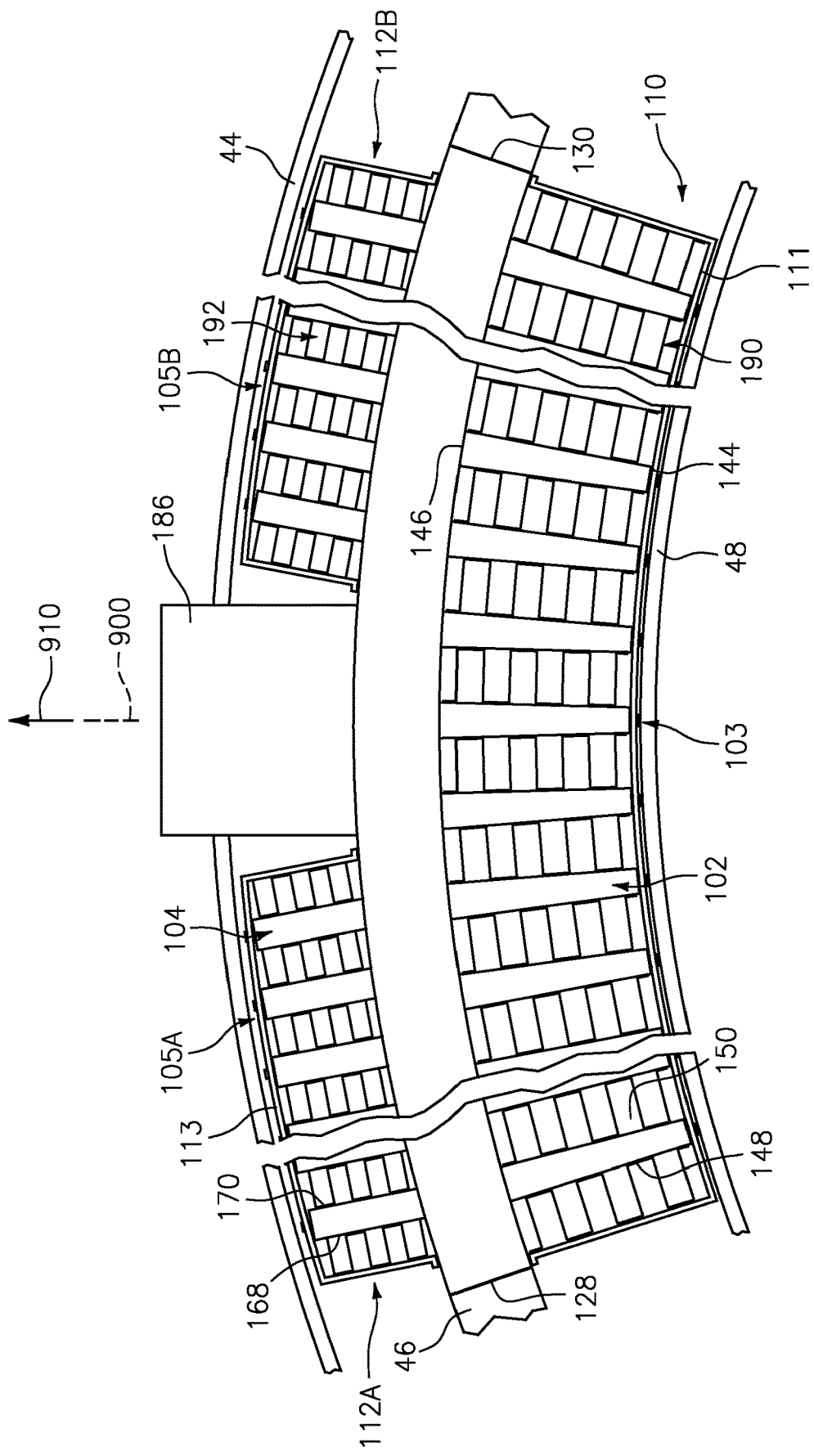
FIG. 3 is a front view of a segment of the heat exchanger.

The FIG. 3 embodiment shows yet a further asymmetry between inner plates 102 and outer plates 104. The exemplary inner plates' 102 surfaces 148 and 150 converge radially inward to allow the surfaces to be parallel to the adjacent surface of the next plate. This allows a constant/uniform amplitude square wave fin 190 to be secured across both (see the '740 patent). Such fins (e.g., bent sheetmetal such as nickel-based superalloy brazed or diffusion bonded to the associated plate substrate) and exemplary plate body/substrate configurations are disclosed in copending U.S. Patent Application No. 62/963,070 (the '070 application), filed Jan. 19, 2020, and entitled "Aircraft Heat Exchangers and Plates", the disclosure of which is incorporated by reference herein in its entirety as if set forth at length. The '070 application also discussed resonance behavior benefits of the face convergence.

In contrast, the outer panels 104 have generally parallel faces 168 and 170 to achieve a similarly efficient use of square wave fin 192 structure. The exemplary inner plates are thus arranged in a single bank 103 forming an even circumferential array. In distinction, the outer plates are in two banks 105A and 105B. The plates in each bank 105A and 105B are parallel to each other (thus not exactly radially extending) but the two banks are offset by a small angle. To provide this, the manifold OD face 122 may be progressively stepped (to allow the bank to better conform to and fill the duct segment) or may be locally flat/planar along each outer bank 105A, 105B. There also may be a shroud 110, 112A, 112B over each bank. Exemplary shrouds are sheetmetal (e.g., cut/bent from nickel-based superalloy sheet stock) having respective circumferential walls 111, 113 and having end walls. The end walls may abut/join a fin structure of the adjacent terminal plate in the associated plate bank and may be secured to the manifold via welded, brazed, and/or fastener-secured flanges (see the '091 application which also discloses plate body/substrate configurations). The arcuate shroud circumferential wall 111, 113 reflects the stepping of the mating manifold surface. Thus, having the two banks slightly diverging from each other facilitates the presence of the inlet conduit 184 (FIG. 2) and/or outlet conduit 186 (FIG. 3) between the banks.

The heat exchanger may be used for internal engine cooling purposes (e.g., cooling a compressed bleed flow bled from the compressor and directing it to cool the turbine). Alternative cooling involves similarly drawing bleed air but directing it to elsewhere in the aircraft (e.g., to a PTMS). A single heat exchanger may serve both purposes (with outlet flow split) or there may be multiple such heat exchangers each with a dedicated purpose. Yet another purpose involves non-bleed flows. For example, there may be in-aircraft cooling requirements wherein a flow from the aircraft fuselage is passed to the heat exchanger inlet and returned via the outlet (e.g., a closed-loop system).

Exemplary manifold and plate manufacture techniques are as in the '091 application (e.g., casting or additive manufacture of alloys such as nickel-based superalloy). Similarly, exemplary plate interior configurations are as in the '091 application and the '070 application.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbine engine heat exchanger comprising:
   a manifold having a first face and a second face opposite the first face;
   a plurality of first plates along the first face, each first plate having an interior passageway;
   a plurality of second plates along the second face, each second plate having an interior passageway; and
   a first flowpath passing through the interior passageways of the first plates, the manifold, and the interior passageways of the second plates,
   wherein:
   the manifold forms a transfer plenum into which respective first flowpath legs through the first plates merge and from which respective second flowpath legs through the second plates split;
   the manifold forms an inlet plenum from which respective first flowpath legs through the first plates split; and
   the manifold forms an outlet plenum into which respective first flowpath legs through the second plates merge.

2. The turbine engine heat exchanger of claim 1 wherein: the first flowpath passes sequentially through:
   the interior passageways of the first plates;
   the manifold; and
   the interior passageways of the second plates.

3. The turbine engine heat exchanger of claim 1 wherein: the first face is concave and the second face is convex.

4. The turbine engine heat exchanger of claim 1 wherein: the first plates and the second plates comprise castings.

5. The turbine engine heat exchanger of claim 1 wherein: the first plates and the second plates each have:
   a proximal edge mounted to the manifold and an opposite distal edge;
   a forward edge and an aft edge; and
   an inlet to the respective first passageway and an outlet from the respective first passageway;
   the first plates' outlets are along the associated first plate proximal edge, forward of the first plates' inlets;
   the second plates' inlets are along the associated second plate proximal edge; and
   the second plates' outlets are forward of the second plates' inlets.

6. The turbine engine heat exchanger of claim 1 wherein: the first plates are circumferentially arrayed in at least one first bank; and
   the second plates are in at least one second bank, wherein within each second bank the second plates share a common parallel orientation.

7. The turbine engine heat exchanger of claim 6 wherein: within each respective bank all plates are joined by wave fins.

8. A turbine engine including the turbine engine heat exchanger of claim 1 and further comprising:
   one or more fan sections;
   one or more compressor sections aft and downstream of the one or more fan sections along a core flowpath;
   a combustor section downstream of the one or more compressor sections along the core flowpath;
   one or more turbine sections downstream of the combustor section along the core flowpath;
   an outer bypass flowpath;
   an inner bypass flowpath; and
   a wall between the outer bypass flowpath and the inner bypass flowpath, wherein:
   exteriors of the first plates are along the inner bypass flowpath; and
   exteriors of the second plates are along the outer bypass flowpath.

9. The turbine engine of claim 8 wherein:
   the first flowpath is a compressor bleed flowpath.

10. The turbine engine of claim 9 wherein:
    the first flowpath provides turbine cooling.

11. The turbine engine of claim 8 wherein:
    the inner bypass flowpath extends from a stage of the one or more fan sections; and
    the outer bypass flowpath extends from another stage of the one or more fan sections upstream of said stage.

12. The turbine engine of claim 11 wherein:
    the first flowpath extends from within or downstream of the one or more compressor sections.

13. The turbine engine of claim 8 wherein:
    the first plates and the second plates each have:
    an inner diameter edge and an outer diameter edge; and
    an inlet to the respective first passageway and an outlet from the respective first passageway;
    the first plates' outlets are along the associated first plate outer diameter edge, forward of the first plates' inlets;
    the second plates' inlets are along the associated second plate inner diameter edge; and
    the second plates' outlets are forward of the second plates' inlets.

14. The turbine engine of claim 13 wherein:
    the first plates' inlets are along the associated first plate outer diameter edge.

15. The turbine engine of claim 13 wherein:
    the second plates' outlets are along the associated second plate inner diameter edge.

16. A method for using the turbine engine of claim 8, the method comprising running the turbine engine to:
    transfer thermal energy from a flow along the first flowpath to an inner bypass flow along the inner bypass flowpath and an outer bypass flow along the outer bypass flowpath.

17. The method of claim 16 wherein the running of the turbine engine further comprises:

passing the outer bypass flow to the heat exchanger at a first temperature and first pressure;
passing the inner bypass flow to the heat exchanger at a second temperature and second pressure greater than the first temperature and first pressure, respectively; and
passes passing the flow along the first flowpath to the heat exchanger at a third temperature and third pressure greater than the second temperature and second pressure, respectively.

18. The method of claim 16 wherein:
the flow is generally counterflow to the inner bypass flow and outer bypass flow.

19. A turbine engine heat exchanger comprising:
a manifold having a first face and a second face opposite the first face;
a plurality of first plates along the first face, each first plate having an interior passageway;
a plurality of second plates along the second face, each second plate having an interior passageway; and
a first flowpath passing through the interior passageways of the first plates, the manifold, and the interior passageways of the second plates,
wherein:
the manifold forms an inlet plenum from which respective first flowpath legs through the first plates split;
the manifold forms a transfer plenum into which respective first flowpath legs through the first plates merge and from which respective second flowpath legs through the second plates split;
the first plates are joined by wave fins having peaks secured to one joined plate and troughs secured to the other joined plate; and
the second plates are joined by wave fins having peaks secured to one joined plate and troughs secured to the other joined plate.

20. The turbine engine heat exchanger of claim 19 wherein:
the first face is concave and the second face is convex;
the first plates are circumferentially arrayed in at least one first bank; and
the second plates are in at least one second bank, wherein within each second bank the second plates share a common parallel orientation.

* * * * *